(12) United States Patent
Maenner et al.

(10) Patent No.: US 7,723,885 B2
(45) Date of Patent: May 25, 2010

(54) HYBRID DRIVE UNIT

(75) Inventors: Andreas Maenner, Salem (DE);
Matthias Reisch, Ravensburg (DE)

(73) Assignee: ZF Friedrichshafen AG,
Friedrichshafen (DE)

( * ) Notice: Subject to any disclaimer, the term of this patent is extended or adjusted under 35 U.S.C. 154(b) by 320 days.

(21) Appl. No.: 11/844,435

(22) Filed: Aug. 24, 2007

(65) Prior Publication Data

US 2008/0051249 A1 Feb. 28, 2008

(30) Foreign Application Priority Data

Aug. 26, 2006 (DE) .................. 10 2006 040 118

(51) Int. Cl.
*B60K 6/02* (2006.01)
*H02K 7/18* (2006.01)
*F16C 19/52* (2006.01)

(52) U.S. Cl. .................. 310/91; 310/112; 310/113; 477/7

(58) Field of Classification Search .......... 310/112, 310/114, 91, 261, 113; 477/7; 180/65.1, 180/65.2
See application file for complete search history.

(56) References Cited

U.S. PATENT DOCUMENTS

| 5,952,746 | A * | 9/1999 | Mittmann et al. | 310/12.31 |
| 6,258,001 | B1 | 7/2001 | Wakuta | |
| 6,448,674 | B1 * | 9/2002 | Schierling et al. | 310/418 |
| 6,577,036 | B2 * | 6/2003 | Beatty et al. | 310/91 |
| 6,700,280 | B1 * | 3/2004 | Geiger et al. | 310/193 |
| 6,720,696 | B2 * | 4/2004 | Berhan | 310/113 |
| 6,842,967 | B2 * | 1/2005 | Wingeier | 29/598 |
| 7,394,177 | B2 * | 7/2008 | Vogt et al. | 310/91 |
| 2006/0022539 | A1 | 2/2006 | Burgman et al. | |

FOREIGN PATENT DOCUMENTS

| DE | 3912339 | 10/1990 |
| DE | 19962507 | 12/2000 |
| DE | 10035028 | 1/2002 |
| DE | 102005034654 | 3/2006 |

\* cited by examiner

*Primary Examiner*—Burton Mullins
(74) *Attorney, Agent, or Firm*—Leydig, Voit & Mayer

(57) ABSTRACT

A hybrid drive unit for installation between an internal combustion engine and a vehicle transmission in a motor vehicle. The hybrid drive unit has an electric machine operable, alternatively, as a motor and a generator and having at least one stator and one rotor, the rotor having bearings on a transmission side and on an internal combustion engine side. One set of bearings is provided on the transmission side and, on the internal combustion engine side, the hybrid drive unit is supported on the crankshaft bearings of the internal combustion engine. A non-rotary connection can be established, for example, by means of a flexplate or a torsional vibration damper, between the rotor of the electric machine and the crankshaft of the internal combustion engine. Before the rotor is connected to the crankshaft, the rotor is supported on bearings on the transmission side. A radial safety mechanism is provided on the internal combustion engine side in order to prevent the rotor from tilting around the bearing on the transmission side and from establishing contact with the stator. When the rotor and the crankshaft are not connected to each other, the radial safety mechanism prevents contact between the rotor and the stator, and thus destruction of the electric machine.

20 Claims, 4 Drawing Sheets

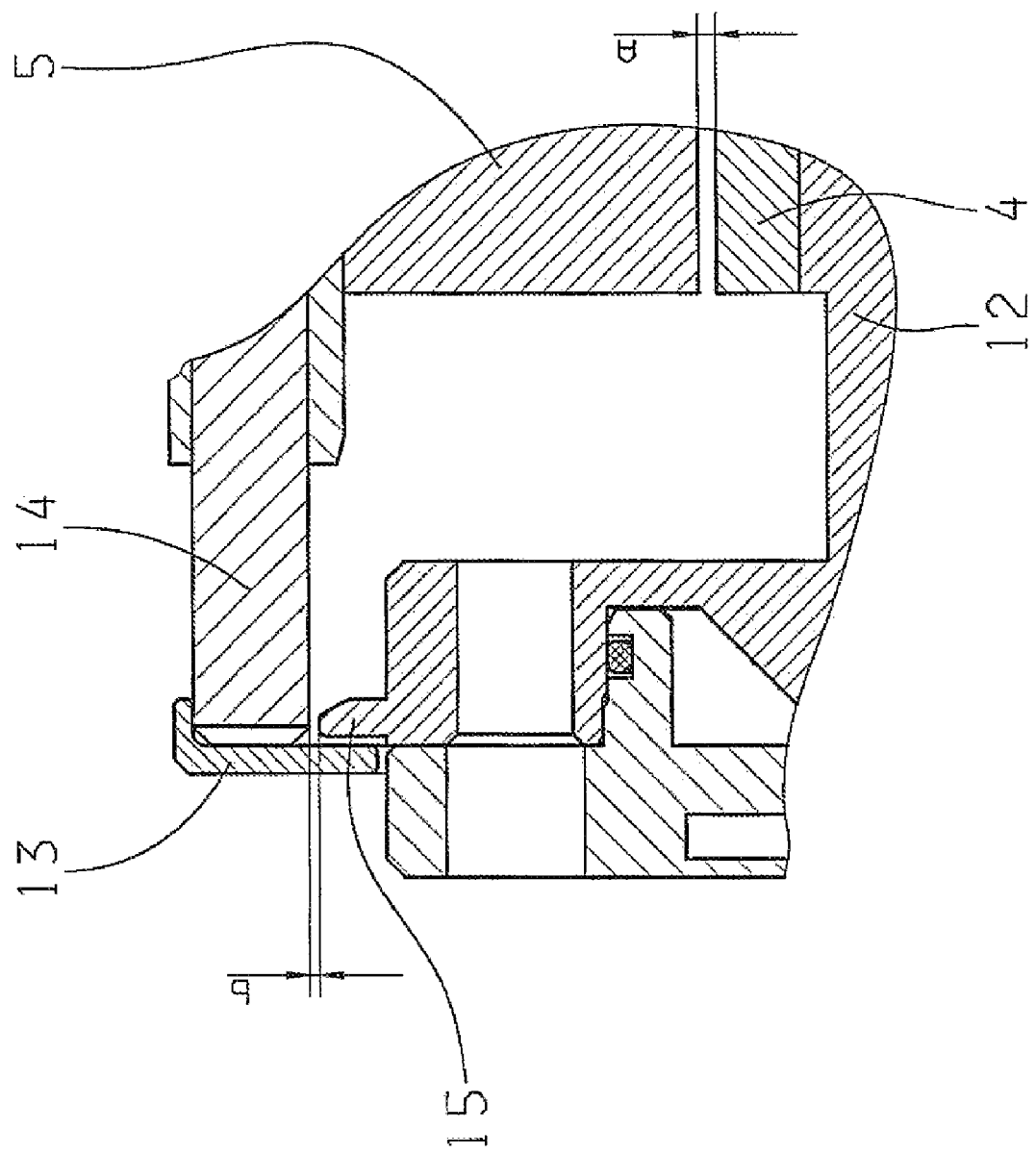

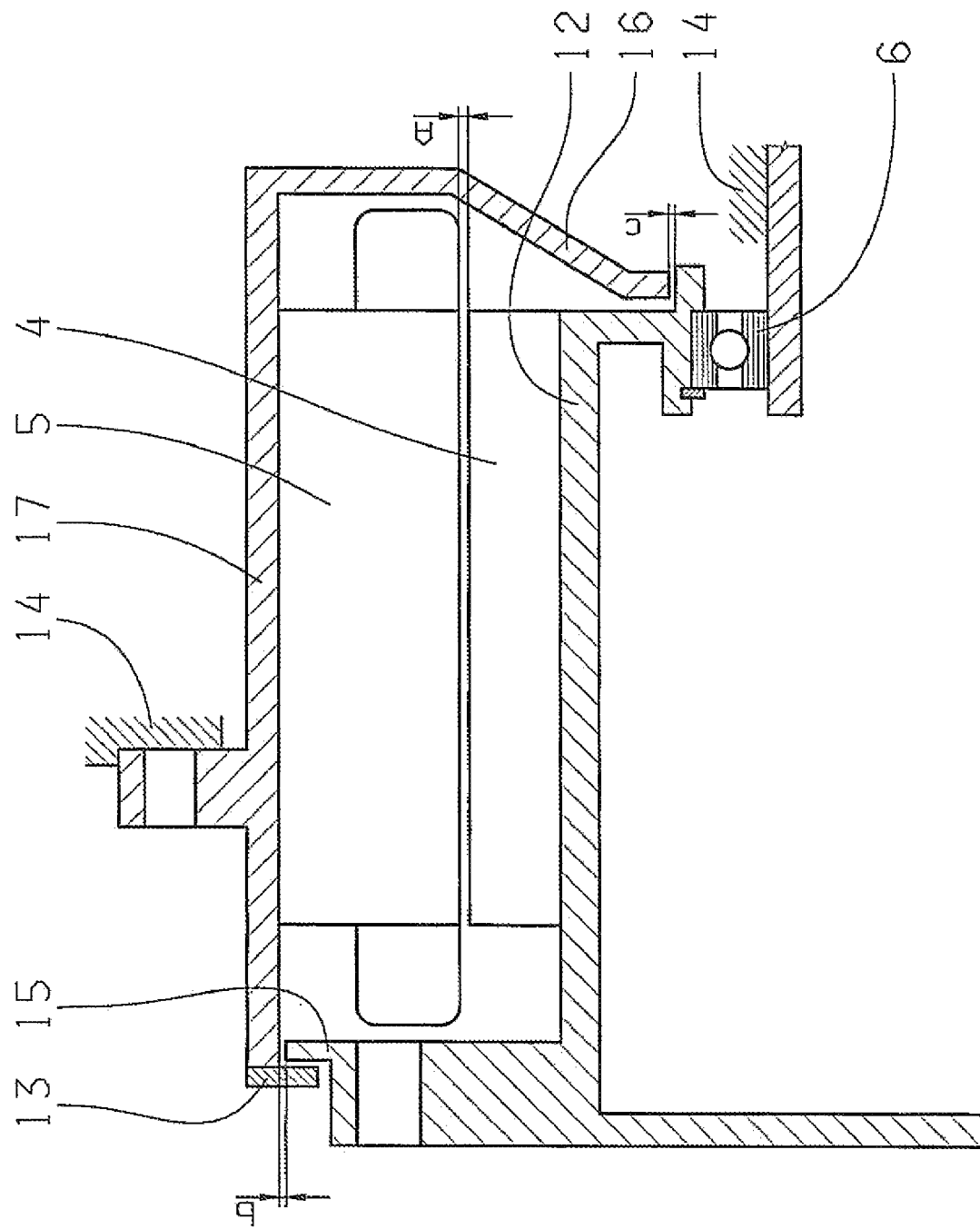

HYBRID DRIVE UNIT

Priority is claimed to German Patent Application No. DE 10 2006 040 118.2, filed on Aug. 26, 2006, the entire disclosure of which is incorporated by reference herein.

The present invention relates to a hybrid drive unit for installation between an internal combustion engine and a transmission of a motor vehicle.

BACKGROUND

A drive used in hybrid vehicles usually consists of a combination of an internal combustion engine with an electric machine. For example, DE 199 62 507 discloses an electric machine situated between an internal combustion engine and a transmission. The rotor of the electric machine is attached directly to the crankshaft of the internal combustion engine, as a result of which it only needs to be mounted on bearings on the transmission sides of the rotor. This approach saves space since there is no need for bearings on the internal combustion engine side.

Synchronous machines with permanent magnets are often employed as the electric machine. Contact between the rotor and the stator is to be avoided since contact between the rotor and the stator can destroy the synchronous machine owing to the high magnetic forces.

When synchronous machines are used and also when, as described in DE 199 62 507, the rotor of the electric machine is equipped only with one set of bearings of its own and is directly connected to the crankshaft of the internal combustion engine, disadvantageous situations arise when the rotor is not connected to the crankshaft, for instance, prior to the assembly, especially before the rotor is connected to the crankshaft, or else when repairs have to be made that involve disconnecting the rotor from the internal combustion engine. When the electric machine or the rotor of the electric machine is not connected to the crankshaft of the internal combustion engine, the rotor can tilt around the bearings on the transmission side, causing contact between the metal and/or magnetic components of the rotor and of the stator of the electric machine, which would destroy the electric machine.

SUMMARY OF THE INVENTION

Therefore, it is an objective of the present invention to provide a hybrid drive unit that has an electric machine connected to the crankshaft of an internal combustion engine as well as a safety mechanism that prevents contact between the metal and/or magnetic components of the rotor and of the stator of the electric machine prior to the joining of the hybrid drive unit to the internal combustion engine. After the assembly, the safety mechanism must not influence the function or performance of the electric machine during the operation of the hybrid drive unit. At the same time, the safety mechanism has to perform its safeguarding function in case the hybrid drive unit is dismantled from the internal combustion engine or transmission.

The present invention provides a hybrid drive unit that is intended, for instance, for installation between an internal combustion engine and a vehicle transmission in a motor vehicle. The hybrid drive unit has an electric machine that can be operated as a motor or as a generator and that has at least one stator and one rotor. The rotor has bearings on the transmission side and on the internal combustion engine side, whereas the hybrid drive unit only has bearings on the transmission side since, on the internal combustion engine side, the hybrid drive unit is supported on the crankshaft bearings of the internal combustion engine. A non-rotary connection can be established, for example, by means of a flexplate or a torsional vibration damper, between the rotor of the electric machine and the crankshaft of the internal combustion engine. Before the rotor is connected to the crankshaft, the rotor is only supported on bearings on the transmission side. A radial safety mechanism is provided in order to prevent the rotor from tilting around the bearing on the transmission side and from establishing contact between the metal and/or magnetic components of the rotor and of the stator of the electric machine. When the rotor and the crankshaft are not connected to each other, the radial safety mechanism advantageously prevents contact between the metal and/or magnetic components of the rotor and of the stator, and thus destruction of the electric machine.

Should the rotor tilt, the radial safety mechanism comes to rest against a component that is located across from it, even before any contact is made between the metal and/or magnetic components of the rotor and of the stator of the electric machine that would cause the rotor and the stator to magnetically adhere to each other and destroy the electric machine. After the electric machine has been mounted on the internal combustion engine, the radial safety mechanism is not in contact with the component that is located across from it and also does not exert any influence on the electric machine. In this manner, neither the function nor the effect of the electric machine is influenced by the tilt safety mechanism and the rotor can be mounted with only one set of bearings in the hybrid drive unit without the need for the hybrid drive unit to be immediately connected to the crankshaft. At the same time, this allows the hybrid drive unit to be dismantled from the internal combustion engine when necessary, without the rotor coming into contact with the stator and destroying the electric machine. The radial safety mechanism is provided at the end of the rotor and of the stator.

Moreover, when the end of the rotor on the transmission side is not mounted on the stator or on a component affixed to the stator, but rather on a component affixed to the transmission, for instance, on the transmission housing, a radial safety mechanism is also provided on the end of the rotor or of the stator on the transmission side. As already described, the function and configuration of the radial safety mechanism on the transmission side are equivalent to the function and configuration of the radial safety mechanism on the internal combustion engine side.

When the rotor in its installed state is situated in its centered axial position, there is a radial air gap between the radial safety mechanism on the internal combustion engine side and on the transmission side and a component that is located across from said radial safety mechanism. According to the invention, this air gap is smaller than the radial distance between the rotor and the stator so that any contact between the rotor and the stator is prevented. If the height of the air gap is designated by b and c, respectively, and the radial distance between the rotor and the stator by A, then the ratio of b or c to A yields the equation:

$$b<A, c<A.$$

If the rotor tilts, then the radial safety mechanism first comes to rest, for example, on the housing before the rotor comes into contact with the stator.

An advantageous embodiment of the radial safety mechanism on the internal combustion engine side is in the form of a flange ring provided on the rotor support. This flange ring is configured facing outwards towards the stator support and it forms an air gap between itself and the stator support. As an alternative, the radial safety mechanism consists of a structural element formed on the stator support that is configured facing radially inwards and that forms an air gap between itself and a rotor surface or rotor support surface that is located across from it. A third possibility is the combination of a flange ring with the structural element formed on the stator support, whereby the air gap can be provided at any desired radial place between the bases of the flange ring and the structural element.

A fourth possibility to prevent contact between the metal and/or magnetic components of the stator and of the rotor would be to provide a layer made of an insulating material either on the rotor or on the stator. When, for example, the permanent magnets are secured in place by wrapping the rotor, the wrapping can be utilized to prevent any contact between the metal and/or magnetic components of the rotor and of the stator.

On the end of the rotor and stator on the internal combustion engine side, there is an axial safety mechanism that prevents the rotor from falling out or shifting during a state in which the rotor and the crankshaft are not connected to each other. An axial shifting of the rotor would put the radial safety mechanism out of operation and allow contact between the rotor and the stator. The axial safety mechanism prevents such a shift. The axial safety mechanism consists of a ring-shaped part or a lock washer that is affixed to a stationary component, for example, to the stator, to the stator support or to the transmission housing. Moreover, a circle segment or several circle segments can be used for purposes of forming the axial safety mechanism. The axial safety mechanism has an air gap between itself and the part that is located across from it. According to the invention, the air gap is narrower than the axial length of the radial safety mechanism. When a connection exists between the rotor and the crankshaft, there is no contact between the axial safety mechanism and the part that is located across from it so that the electric machine can be operated without influence of the axial safety mechanism.

BRIEF DESCRIPTION OF THE DRAWINGS

Additional advantages and advantageous configurations of the invention can be gleaned from the patent claims and from the embodiments schematically described with reference to the drawings. The following is shown:

FIG. 3—a radial section through a radial safety mechanism according to the invention; and FIG. 4—a radial section through an electric machine of the hybrid drive unit according to the invention, in a schematic depiction.

DETAILED DESCRIPTION

Figure 1:
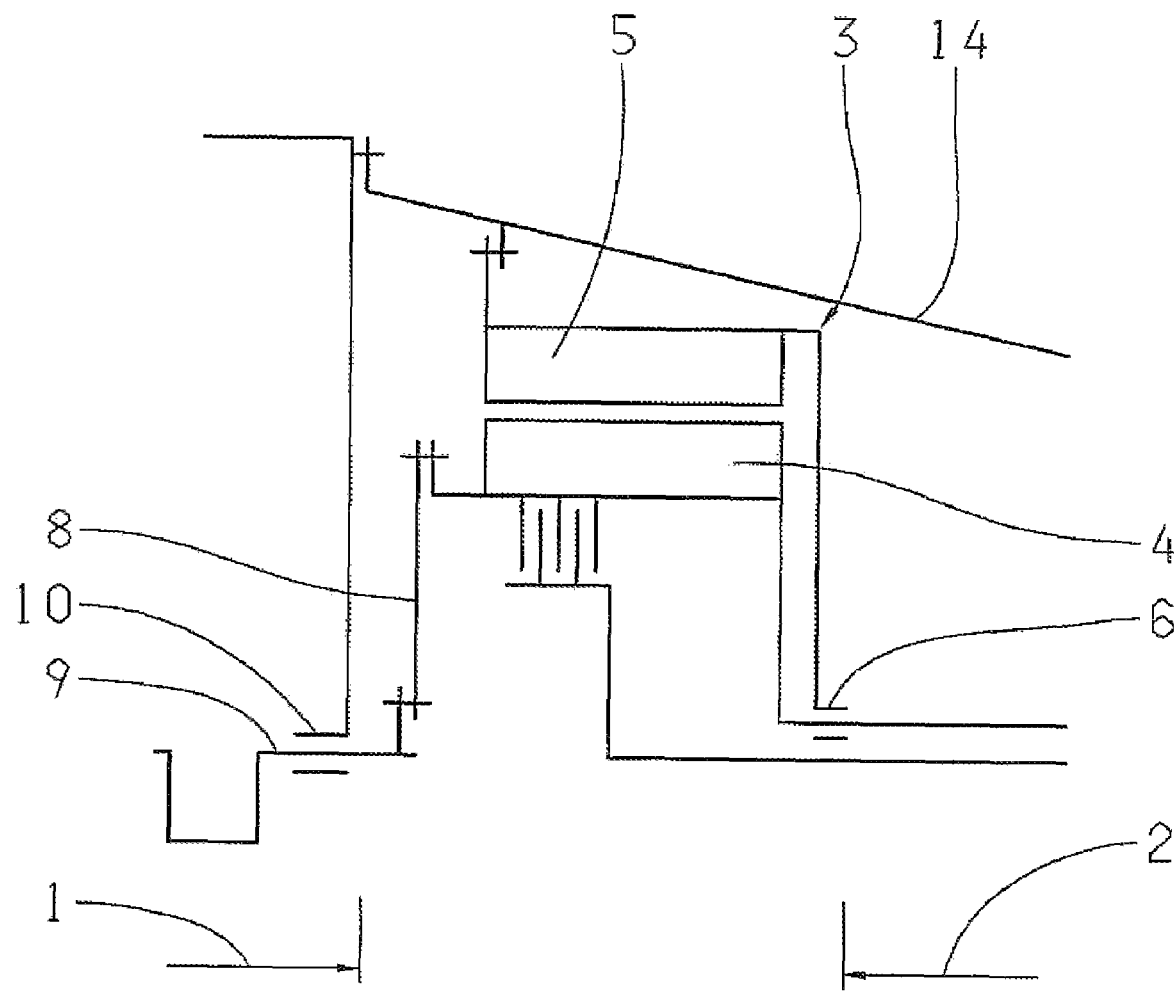
FIG. 1—a hybrid drive unit connected to the internal combustion engine and to the transmission, in a highly schematic depiction.

FIG. 1 schematically shows a hybrid drive unit with an electric machine 3 that is connected to an internal combustion engine 1 and to a transmission 2. The rotor 4 is connected to the crankshaft 9 of the internal combustion engine 1 via the non-rotary connection 8 while the rotor 4 is mounted on the motor side by means of the crankshaft bearings 10. The rotor 4 is mounted on bearings 6 in the support of the stator 5 on the side of the transmission 2. The stator 5 is non-rotationally connected to the hybrid drive unit or to the transmission housing 14.

Figure 2:
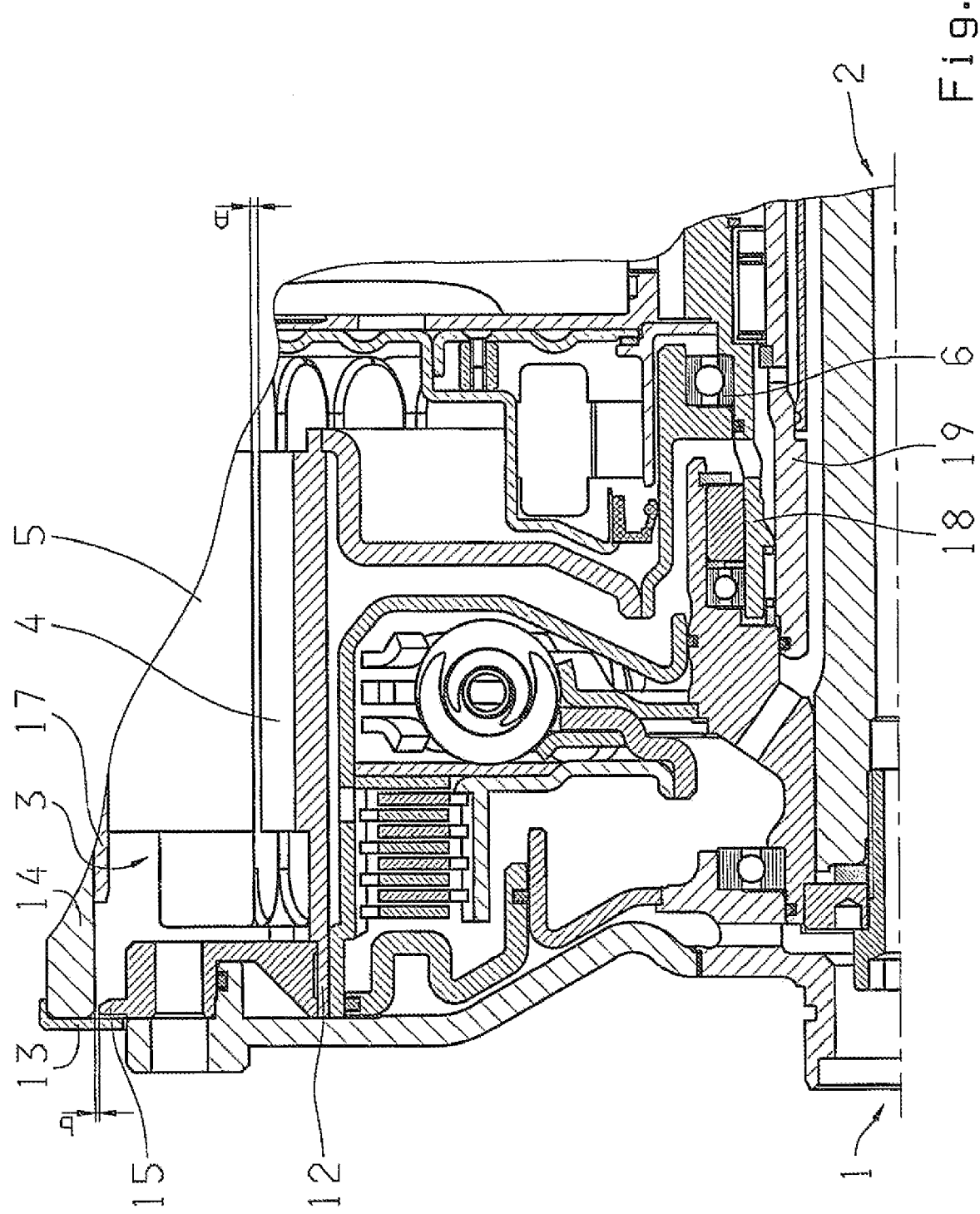
FIG. 2—a radial section through a hybrid drive unit according to the invention.

FIG. 2 shows a hybrid drive unit according to the invention, with an electric machine 3 that comprises a rotor 4 and a stator 5 having an air gap A between the rotor and the stator. The rotor is mounted on bearings 6 on a pump driveshaft 18 on the transmission side 2 of the hybrid drive unit, said pump driveshaft 18, in turn, being mounted on an axis 19 that is affixed to the transmission. The stator 5 is attached in a stator support 17 that is affixed to the housing. In the state shown, in which the rotor 4 on the internal combustion engine side 1 is not connected to an internal combustion engine, the radial safety mechanism 15 prevents the rotor 4 from tilting. The radial safety mechanism 15 is connected to the rotor support 12 and it has a radial air gap b between itself and the hybrid drive housing or the transmission housing 14. According to the invention, the air gap b is smaller than the radial distance A between the rotor 4 and the stator 5. The axial safety mechanism 13 is affixed on the internal combustion engine side 1 of the rotor 4 and of the stator 5 to the hybrid drive housing or transmission housing 14. The axial safety mechanism 13 prevents axial shifting of the rotor 4 in the state shown, in which the hybrid drive unit is not connected to the internal combustion engine.

FIG. 3 shows the radial and axial safety mechanisms 15, 13 on the internal combustion engine side. The radial safety mechanism 15 is configured as a flange ring facing radially outwards from the part 7 that rotates along with the rotor support 12. An air gap b is formed between the radially outer surface of the flange ring 15 and the hybrid drive housing or transmission housing 14. According to the invention, the air gap b is smaller than the radial distance that is structurally designed between the rotor 4 and the stator 5. The axial safety mechanism 13 prevents axial shifting of the rotor 4 in a state in which the rotor 4 is not connected to the crankshaft of the internal combustion engine. The axial safety mechanism 13 is affixed to the hybrid drive housing or transmission housing 14 and it extends radially inwards.

FIG. 4 shows the rotor 4 and stator 5 with the radial and axial safety mechanisms 15, 13 on the internal combustion engine side as well as the radial safety mechanism 16 on the transmission side. The radial safety mechanisms 15, 16 each have an air gap b, c that is smaller than the radial distance A between the rotor 4 and the stator 5. Both radial safety mechanisms 15, 16 act between the rotor support 12, or a part that rotates along with the rotor support 12, and the stator support 17 or a part that is connected to the stator support 17. The hybrid drive unit is affixed, for example, screwed, through the stator support 17 in the transmission housing 14. One end of the rotor 4 in its assembled state is mounted on bearings in the transmission housing 14. When the hybrid drive unit is not joined to the transmission or engine, the radial safety mechanisms 15, 16 prevent any radial shifting of the rotor 4 and thus contact between the stator 5 and the rotor 4.

What is claimed is:

1. A hybrid drive unit for installation between an internal combustion engine and a transmission of a motor vehicle the hybrid drive unit comprising:

an electric machine operable as a motor or a generator and having at least a rotor, a stator and permanent magnets, wherein the electric machine is configured to form a non-rotary connection between the rotor and a crankshaft of the internal combustion engine in a connected state, the rotor having a bearing on a transmission side and being supported on an internal combustion engine side using at least one crankshaft bearing of the internal combustion engine; and a radial safety mechanism configured to prevent contact between metal and/or magnetic components of the rotor and the stator in a disconnected state in which the rotor and the crankshaft are not connected to each other, wherein the rotor is freely rotatable in the connected state, and wherein the rotor and stator are separated from each other by a radial distance and wherein the radial safety mechanism defines an air gap between the safety mechanism and a component disposed radially adjacent to the safety mechanism, the air gap being narrower than the radial distance.

2. The hybrid drive unit as recited in claim 1, wherein the non-rotary connection is formed using at least one of a flex-plate and a torsional vibration damper.

3. The hybrid drive unit as recited in claim 1, wherein the radial safety mechanism is disposed on the internal combustion engine side.

4. The hybrid drive unit as recited in claim 1, wherein the radial safety mechanism is disposed on the transmission side.

5. The hybrid drive unit as recited in claim 1, wherein the radial safety mechanism includes a flange ring affixed to a rotor support.

6. The hybrid drive unit as recited in claim 1, wherein the radial safety mechanism includes an extension of a stator support extending radially inwards.

7. The hybrid drive unit as recited in claim 1, further comprising an axial safety mechanism disposed on the internal combustion engine side configured to prevent an axial shifting of the rotor relative to the stator in the disconnected state.

8. The hybrid drive unit as recited in claim 7, wherein the axial safety mechanism includes a ring-shaped part stationarily affixed relative to the stator.

9. The hybrid drive unit as recited in claim 8, wherein the ring-shaped part is affixed to at least one of the stator, a transmission housing and a hybrid drive housing.

10. The hybrid drive unit as recited in claim 7, wherein the axial safety mechanism includes a lock washer stationarily affixed relative to the stator.

11. The hybrid drive unit as recited in claim 10, wherein the lock washer is affixed to at least one of the stator, a transmission housing and a hybrid drive housing.

12. The hybrid drive unit as recited in claim 7, wherein the axial safety mechanism includes at least one circle segment stationarily affixed relative to the stator.

13. The hybrid drive unit as recited in claim 12, wherein the at least one circle segment is affixed to at least one of the stator, a transmission housing and a hybrid drive housing.

14. A hybrid drive unit for installation between an internal combustion engine and a transmission of a motor vehicle the hybrid drive unit comprising:

an electric machine operable as a motor or a generator and having at least a rotor, a stator and permanent magnets, wherein the electric machine is configured to form a non-rotary connection between the rotor and a crankshaft of the internal combustion engine in a connected state, the rotor having a bearing on a transmission side and being supported on an internal combustion engine side using at least one crankshaft bearing of the internal combustion engine;

a radial safety mechanism configured to prevent contact between metal and/or magnetic components of the rotor and the stator in a disconnected state in which the rotor and the crankshaft are not connected to each other, wherein the rotor is freely rotatable in the connected state; and an axial safety mechanism disposed on the internal combustion engine side configured to prevent an axial shifting of the rotor relative to the stator in the disconnected state, wherein the axial safety mechanism includes a lock washer stationarily affixed relative to the stator.

15. The hybrid drive unit as recited in claim 14, wherein the lock washer is affixed to at least one of the stator, a transmission housing and a hybrid drive housing.

16. The hybrid drive unit as recited in claim 14, wherein the non-rotary connection is formed using at least one of a flex-plate and a torsional vibration damper.

17. The hybrid drive unit as recited in claim 14, wherein the radial safety mechanism is disposed on the internal combustion engine side.

18. The hybrid drive unit as recited in claim 14, wherein the radial safety mechanism is disposed on the transmission side.

19. The hybrid drive unit as recited in claim 14, wherein the axial safety mechanism includes a ring-shaped part stationarily affixed relative to the stator.

20. The hybrid drive unit as recited in claim 19, wherein the ring-shaped part is affixed to at least one of the stator, a transmission housing and a hybrid drive housing.

\* \* \* \* \*